(12) United States Patent
Lange (10) Patent No.: US 9,066,463 B2
(45) Date of Patent: Jun. 30, 2015

(54) CROP FEELER SYSTEM AND METHOD

(71) Applicant: TRIMBLE NAVIGATION LIMITED, Sunnyvale, CA (US)

(72) Inventor: Arthur F. Lange, Sunnyvale, CA (US)

(73) Assignee: TRIMBLE NAVIGATION LIMITED, Sunnyvale, CA (US)

( * ) Notice: Subject to any disclaimer, the term of this patent is extended or adjusted under 35 U.S.C. 154(b) by 363 days.

(21) Appl. No.: 13/633,757

(22) Filed: Oct. 2, 2012

(65) Prior Publication Data

US 2014/0095010 A1 Apr. 3, 2014

(51) Int. Cl.
| | |
|---|---|
| *G05D 1/02* | (2006.01) |
| *A01B 69/04* | (2006.01) |
| *A01D 41/127* | (2006.01) |
| *B62D 6/00* | (2006.01) |
| *G01S 13/91* | (2006.01) |
| *G01S 13/93* | (2006.01) |

(52) U.S. Cl.
CPC ....... *A01B 69/008* (2013.01); *G01S 2013/9342* (2013.01); *G01S 2013/9389* (2013.01); *G01S 13/931* (2013.01); *G01S 2013/9375* (2013.01); *B62D 6/001* (2013.01); *A01D 41/1278* (2013.01); *G05D 1/0227* (2013.01); *G05D 1/0259* (2013.01); *G05D 2201/0201* (2013.01)

(58) Field of Classification Search
CPC ............. G05D 1/0259; A01D 41/1278; A01B 69/008; G01S 13/931; G01S 2013/9342; G01S 2013/9375; G01S 2013/9389
USPC ....................................... 701/23, 26, 50, 301
See application file for complete search history.

(56) References Cited

U.S. PATENT DOCUMENTS

| | | | | |
|---|---|---|---|---|
| 3,732,503 | A | * | 5/1973 | Rapp et al. .................. 331/65 |
| 3,752,960 | A | * | 8/1973 | Walton ...................... 340/5.8 |
| 3,991,618 | A | * | 11/1976 | Stampfer et al. ............ 73/865.9 |
| 5,281,901 | A | * | 1/1994 | Yardley et al. ................ 701/24 |

(Continued)

FOREIGN PATENT DOCUMENTS

| | | |
|---|---|---|
| DE | 2436072 A1 | 2/1975 |
| GB | 1371276 A | 10/1974 |

(Continued)

OTHER PUBLICATIONS

International Search Report and Written Opinion issued in PCT/US2013/062111, mailed Dec. 20, 2013, 13 pages.

(Continued)

*Primary Examiner* — Yonel Beaulieu
*Assistant Examiner* — Dale W Hilgendorf
(74) *Attorney, Agent, or Firm* — Faegre Baker Daniels LLP (57) ABSTRACT

In some embodiments, a crop feeler system automatically executes a navigational task based on a proximity of a vehicle to an obstacle. The crop feeler system includes a hub attached to the vehicle. Inside the hub are two oscillating circuits each having an oscillating frequency. A member is coupled to the hub. Two inductive elements are positioned within the member so that, when the obstacle comes into contact with the member, at least one of the inductive elements moves closer to at least one of the oscillating circuits and alters the oscillating frequency of that oscillating circuit. A navigation sensor measures the oscillating frequency of the oscillating circuit, identifies a navigational task using the oscillating frequency of the oscillating circuit, and executes the navigational task.

20 Claims, 5 Drawing Sheets

(56) References Cited

U.S. PATENT DOCUMENTS

| | | | |
|---|---|---|---|
| 6,321,700 B1 * | 11/2001 | Hein et al. | 123/90.11 |
| 7,222,474 B2 | 5/2007 | Rayfield et al. | |
| 7,430,815 B2 * | 10/2008 | Reichhardt | 33/832 |
| 7,716,905 B2 | 5/2010 | Wilcox et al. | |
| 2002/0167439 A1 * | 11/2002 | Bloch et al. | 342/28 |

FOREIGN PATENT DOCUMENTS

| | | | |
|---|---|---|---|
| GB | 2051540 A | | 1/1981 |
| GB | 2111684 A | * | 7/1983 |

OTHER PUBLICATIONS

Notice Concerning Transmittal of International Preliminary Report On Patentability. International Application No. PCT/US2013/062111. Mail Date: Apr. 16, 2015.

* cited by examiner

CROP FEELER SYSTEM AND METHOD

TECHNICAL FIELD

Embodiments of the present invention relate generally to systems and methods for navigating a vehicle, and in particular, to detecting the proximity of the vehicle with respect to an object and automatically steering the vehicle based on the proximity of the vehicle with respect to the object.

BACKGROUND

Various vehicles are used during the farming process. For example, some farmers use tractors or combines to plant, spray, or harvest crops in a field. In many cases, farmers wish to avoid driving farming vehicles or farming instruments into crops or colliding with other obstacles or with the ground.

SUMMARY

Some embodiments of the present invention utilize a set of inductive elements, such as soft ferrite cores, placed within or on a flexible member, such as a wand. The flexible member is coupled to a hub on a vehicle. Inside the hub are two oscillating circuits that each include an inductor coil, which may be wrapped around a soft ferrite U-core. As the vehicle approaches a crop, the flexible member will contact the crop and flex towards the housing, bringing an inductive element in the flexible member closer to an oscillating circuit. This increases the overall inductance of the oscillating circuit and thereby changes the oscillating frequency of that oscillating circuit. A navigation sensor measures the oscillating frequency of each oscillating circuit, determines a navigational task based on the oscillating frequencies, and executes the navigational task.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
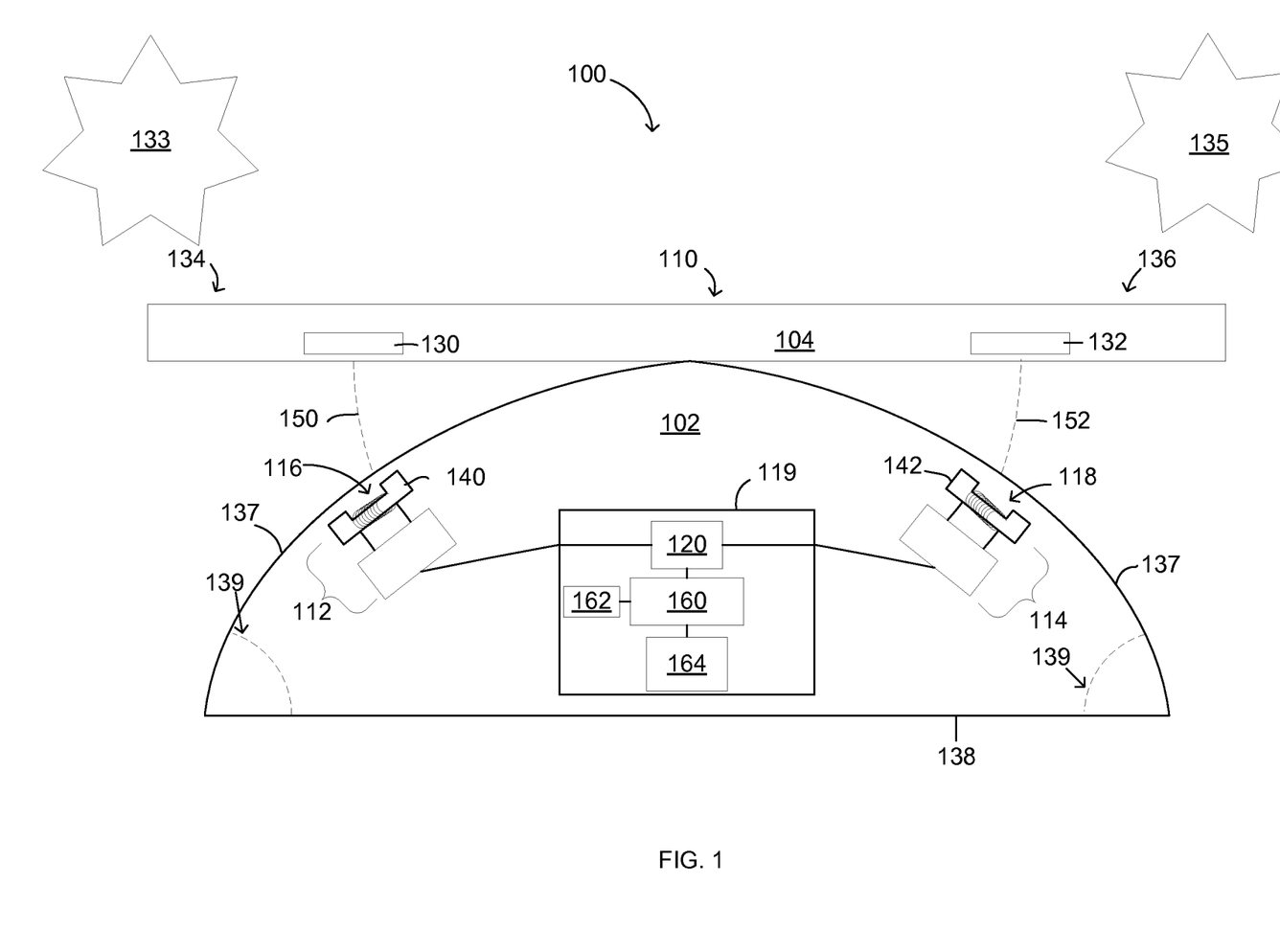
FIG. 1 depicts an overhead component view of a hub and a flexible member according to embodiments of the present invention.

In the embodiments shown in FIG. 1, a crop feeler system 100 includes a hub 102 and a member 104. The hub 102 is attached to a vehicle (e.g., to the front end of the vehicle or to a boom attached to the vehicle). On or inside the hub 102 are oscillating circuits 112, 114, which include inductors 116, 118, respectively. The hub 102 also includes a navigation sensor 119 that includes a frequency analyzer 120 coupled to the oscillating circuits 112, 114. As shown in FIG. 1, a single member 104 is attached to the hub 102 at approximately a midpoint 110 of the member 104. The member 104 may be a flexible member, such as a flexible wand, that tapers down towards its outer edges. The member 104 includes inductor elements 130, 132 that are located on opposite sides 134, 136 of the member 104. As the vehicle encounters an object, for example, a crop 133, 135, the sides 134, 136 of the member 104 will flex towards the hub 102, bringing the inductor elements 130, 132 closer to the oscillating circuits 112, 114 and to the inductors 116, 118. This will increase inductance of the oscillating circuits 112, 114 and thereby change the oscillating frequency of the oscillating circuits 112, 114. The navigation sensor 119 measures the changed frequency of the oscillating circuits 112, 114 and uses those frequencies to determine the proximity of the vehicle to crop 133, 135 and/or to determine navigational instructions to automatically steer the vehicle with respect to the crop 133, 135. The details of that system and process, as well as particulars regarding the hub 100 and the member 102, according to various embodiments, are discussed below in more detail.

The hub 102 shown in FIG. 1 has a curved front surface 137 and a back surface 138. In some embodiments, the front surface 137 forms an angle 139 with the back surface 138 that ranges from 15° to 20°, though embodiments with larger and smaller angles 139 are also contemplated. The back surface 138 may be flat or otherwise shaped to facilitate coupling to the vehicle. Various shapes and configurations are also envisioned for the hub 102. For example, hub 102 could be a hemisphere, a cylinder, a modified pyramid, a modified cone, or any section of any one of those geometric configurations. In some embodiments, the curved surface 137 is used to prevent additional stress points where the member 104 contacts the hub 102. The hub 102 may be formed by injection molding.

The hub 102 includes oscillating circuits 112, 114 located within the hub 102, partially within the hub 102, or external to the hub 102 (e.g., on or flush with the front surface 137). In the embodiments shown in FIG. 1, the oscillating circuits 112, 114 are placed in opposing regions of the hub 102. For example, oscillating circuit 112 may be placed on a left side of the hub 102 and the oscillating circuit 114 may be placed on a right side of the hub 102. In other embodiments, the oscillating circuits 112, 114 may both be placed on the same side of the hub 102. The hub 102 may include one, two, three, or more oscillating circuits. In some embodiments, the oscillating circuits 112, 114 are placed so that there is approximately one-half inch of space between each oscillating circuit 112, 114 and its corresponding inductor element 130, 132 when no object or external force is pushing or pulling on the member 102. In those embodiments, the one-half inch of space may vary by one-quarter of an inch or more.

The oscillating circuits 112, 114 may take a variety of forms, such as, for example, Vackář oscillators, Colpitts oscillators, Hartley oscillators, or any other stable oscillator known in the art. The oscillating circuits may be either series tuned circuits or parallel tuned circuits. In addition, the oscillating circuits may be formed with integrated circuits or with discrete circuit components.

In some embodiments, the oscillating circuits 112, 114 oscillate at an oscillating frequency or at a range of oscillating frequencies. The frequency or range of frequencies at which the oscillating circuits oscillate may depend on, e.g., specific electronic components within the oscillating circuits (such as particular capacitors, inductors, etc.) as well as various components external to the oscillating circuits (such as connecting cables, nearby circuits, etc.) or other electro-magnetic influences contributed by various features of the hub, wand, vehicle, etc. In some embodiments, each oscillating circuit 112, 114 may be insulated from other components of the crop feeler system 100 to reduce or eliminate electro-magnetic sources affecting the oscillating frequencies of the oscillating circuits 112, 114. For example, components of an oscillating circuit may be electrically insulated from other components by insulating materials, such as urethane-based materials. In addition, the oscillating circuits 112, 114 may be located away from each other to minimize electro-magnetic interactions between the oscillating circuits 112, 114.

In the embodiments shown in FIG. 1, the oscillating circuits 112, 114 each include an inductor 116, 118. In other embodiments, the oscillating circuits 112, 114 do not include inductors 116, 118, but instead include other components that are responsive to changes in electro-magnetic characteristics of the system 100. Within the hub 102, as shown in FIG. 1, the inductor 116 is wrapped around a soft ferrite U-core 140 and the inductor 118 is wrapped around another soft ferrite U-core 142. Those soft ferrite U-cores 140, 142 may be formed of a manganese-zinc-based ferrite. In other embodiments, the inductors 116, 118 may be wrapped around cores of varying compositions and varying geometric configurations. For example, the cores may be formed of a material (e.g., a ferrite material) with a high initial permeability. The materials for the cores may also be selected based on their response to various temperatures. The cores may also be rods or I-cores instead of U-cores. In some embodiments, the inductors 116, 118 are each wrapped around cores of different compositions or are not wrapped around a core.

As also shown in FIG. 1, the member 104 includes an inductor element 130, such as a manganese-zinc-based ferrite I-core. Because the member 104 is designed to contact obstacles, using ferrite cores is particularly useful because those cores will still operate with a relatively high degree of proficiency even after enduring repeated blows and/or physical cracking or breaking. In other embodiments, the inductor element 130 may be ferromagnetic cores of varying compositions and geometric configurations, similar to the cores 140, 142 discussed above.

In the embodiments illustrated by FIG. 1, the member 104 includes inductor elements 130, 132 placed in opposite sides of the member 104. For example, inductor element 130 may be placed on the left half 134 of the member 104 and inductor element 132 may be placed on the right half 136 of the member 104. In other embodiments, both the inductor element 130 and the inductor element 132 may be placed on the same side or portion of the member 104. Additional inductor elements may be placed on either side of the member 104. The inductor elements may be placed within the member 104, on an outer surface of the member 104, or within a recess so that an outer surface of an inductor element lies flush with the outer surface of the member 104. According to some embodiments, the location and position of the inductor elements correspond to the locations of oscillating circuits in the hub 102, such that each inductor element is associated with a single oscillating circuit, and vice versa. In other embodiments, more than one inductor element is associated with a single oscillating circuit and/or more than one oscillating circuit is associated with a single inductor element.

When the crop feeler system 100 encounters an obstacle 133, such as a crop, the member 104 will contact the obstacle 133, which causes the member to flex toward the hub 102. For example, if the left side 134 of the member 104 contacts the obstacle 133, it will flex towards the hub 102 along an arc 150 that intersects the oscillating circuit 112. In this manner, the inductive element 130 is brought closer to the oscillating circuit 112. Bringing the inductive element 130 closer to the oscillating circuit 112 will alter the frequency at which the oscillating circuit 112 oscillates. Likewise, if the right side 136 of the member 104 contacts an obstacle 135, it will flex towards the hub along an arc 152 that intersects the oscillating circuit 114, thus altering the frequency at which the oscillating circuit 114 oscillates. In those embodiments, the inductive elements 130, 132 will increase the overall system inductance affecting the oscillating circuits 112, 114, causing the oscillating frequencies of those oscillating circuits 112, 114 to decrease. In some embodiments, the member 104 is designed to contact a particular type of obstacle, e.g., corn stalks. In those embodiments, the member 104 is formed with a particular resiliency for that obstacle. Other members 104 with varying characteristics may be used to contact different types of obstacles (e.g., a more flexible member 104 would be used with soybean plants than with corn stalks).

In some embodiments, the hub 102 includes a navigation sensor 119, which may include one or more processor-based components. In some embodiments, the navigation sensor 119 includes one or more frequency analyzers 120, one or more directional adjusters 160 adapted to identify steering directions for the vehicle (e.g., actions needed to move the vehicle away from the object contacting the member 104) based on the frequency of the oscillating circuit, and memory 162 that includes a set of calibration data used by the directional adjusters 160. In some embodiments, the memory 162 stores a set of calibration data that may be generic calibration data or calibration data derived using the particular crop feeler system 100 in which the calibration data is stored. Components of the navigation sensor 119 may be included within the hub 102 or may be located outside of the hub 102 (e.g., incorporated into an external computer or server).

The navigation sensor 119 determines, executes, and/or transmits a navigational task based on the proximity of the vehicle to the obstacle. An exemplary navigational task is determining navigation directions for steering the vehicle and/or implementing those navigation directions. Another navigational task is determining the distance from the vehicle to the obstacle and displaying that distance to the vehicle's user. Other navigational tasks include calculating the distance from the vehicle to the obstacle, storing the distance in a database, wirelessly transmitting the distance to a remote server, and/or mapping crop locations. In some embodiments, the navigation sensor 119 measures the frequency of the oscillating circuits 112, 114 and uses that data to determine specific navigational actions without specifically computing the distance from the vehicle to the obstacle.

In some embodiments, the navigation sensor 119 records a series of frequency measurements for one or more oscillating circuits based on a series of member displacements and uses that set of data to determine the general relationship between the vehicle and the obstacles (e.g., the crop). The navigation sensor 119 may then compute navigational directions. Thus, in these embodiments, individual measurements are not used in isolation but are instead used as part of an ensemble of measurements. For example, in some embodiments, the navigation sensor 119 determines member displacement (e.g., the distances one or more members or ends of members 104 have moved due to contact with an obstacle) by applying a series of frequency measurements to a displacement curve generated with calibration data. In other words, the navigation sensor 119 translates the series of frequency measurements into displacement indications using the displacement curve. In a specific example, the obstacles may be a pair of crop rows, with small distance discrepancies between individual plants in the row (e.g., because each plant grows slightly differently, because some plants may be planted slightly off-center, or because of a small gap in a crop row). Using an ensemble technique allows the navigation sensor 119 to determine the navigational action with respect to the general trajectory of the crop rows (e.g., aligning the vehicle with a midpoint between two rows), rather than requiring individual responses from contact with each plant in each row.

In some embodiments, the navigation sensor 119 may average frequency measurements for a particular oscillator as part of an ensemble technique. The navigation sensor 119 may also assign weight values to certain frequency measurements as part of an ensemble technique. For example, if a crop row has a small gap, the frequency measurements for the oscillating circuit assigned to that crop row will indicate that the member 104 was in the unflexed position while in that gap and in a flexed position otherwise. In that scenario, the navigation sensor 119 may be programmed to remove, ignore, or assign weight values to particular data points (e.g., outlying data points) to more accurately determine the navigation task with respect to the crop row as a whole. The navigation sensor may assign weight values either to frequency measurements before applying those frequency measurements to a displacement curve or to the displacement determinations after the frequency measurements have been applied to the displacement curve. For another example, the navigation sensor 119 may use only the maximum member displacement or minimum member displacement over a period of time to determine the navigational action. In some embodiments, the navigation sensor 119 may be coupled to two hubs assigned to the same crop rows. In those embodiments, the navigation sensor 119 may average the measurements from each hub. The particular method for determining the navigational action (e.g., selecting an ensemble technique) may be task specific.

The output of the navigation sensor (e.g., the directional adjuster 160) may be transmitted to other system components using either wired or wireless protocols and/or may be transmitted for user consumption through other mechanisms (e.g., through audio signals). In some embodiments, the output of the directional adjusters 160 is conveyed to a vehicle control system 164, which automatically steers the vehicle based on that output. In some embodiments, the frequency analyzer 120, the directional adjusters 160, and/or the vehicle control system 164 share a single processor, while in other embodiments those components each employ a dedicated processor. In some embodiment the vehicle control system 164 includes components within the hub 102 while in other embodiments the vehicle control system 164 is external to the hub 102. While FIG. 1 depicts components as located inside the hub 102, in other embodiments some or all of those components are located outside the hub 102. For example, if multiple hubs are located on a vehicle, the crop feeler system may employ a single navigation sensor 119 centrally located outside of the hubs and/or may employ a single directional adjuster 160 centrally located outside of the hubs with frequency analyzers 120 placed within each hub.

In some embodiments, the vehicle includes multiple hubs 102 placed on both sides of the vehicle. For example, two or more hubs 102 may be placed on either side of a tractor boom. The location of one or more hubs 102 on the each side of a boom may correspond to a separation between rows of crops. In some embodiments, the hubs 102 are fixed to the vehicle at predetermined distances, while in other embodiments the hubs 102 are selectively fixed to the vehicle and can slide along the vehicle (e.g., along the boom) to a determined position. In some embodiments, the hubs 102 are placed so that the center of each hub 102 aligns with a midline between two rows of crops. As the vehicle progresses down the field, if the vehicle veers off its intended course (e.g., slightly to the left), the left side 134 of the member 104 will contact the left crop row. The navigation sensor 119 detects the deviation through the changed oscillating frequencies and automatically adjusts the course of the vehicle. In other embodiments, the navigation sensor 119 computes how far the vehicle has deviated from a preset course based on measurements from one or more hubs and conveys that information to a user. In some embodiments, each end 134, 136 of the member 104 contacts a crop row, and the navigation sensor 119 compares the oscillating frequencies to determine whether the vehicle has deviated from its intended course.

In some embodiments, the navigation sensor 119 includes an override feature that allows a user to reset or re-zero the navigation sensor 119. Specifically, the determinations made by the navigation sensor 119 may drift over time, for example, because of temperature changes that affect the oscillating frequencies. The override feature allows a user to navigate the vehicle to the midline between two crop rows and instruct the navigation sensor 119 to treat the current set of oscillating frequencies as indicative of the correct position with respect to the crop rows.

Figure 2:
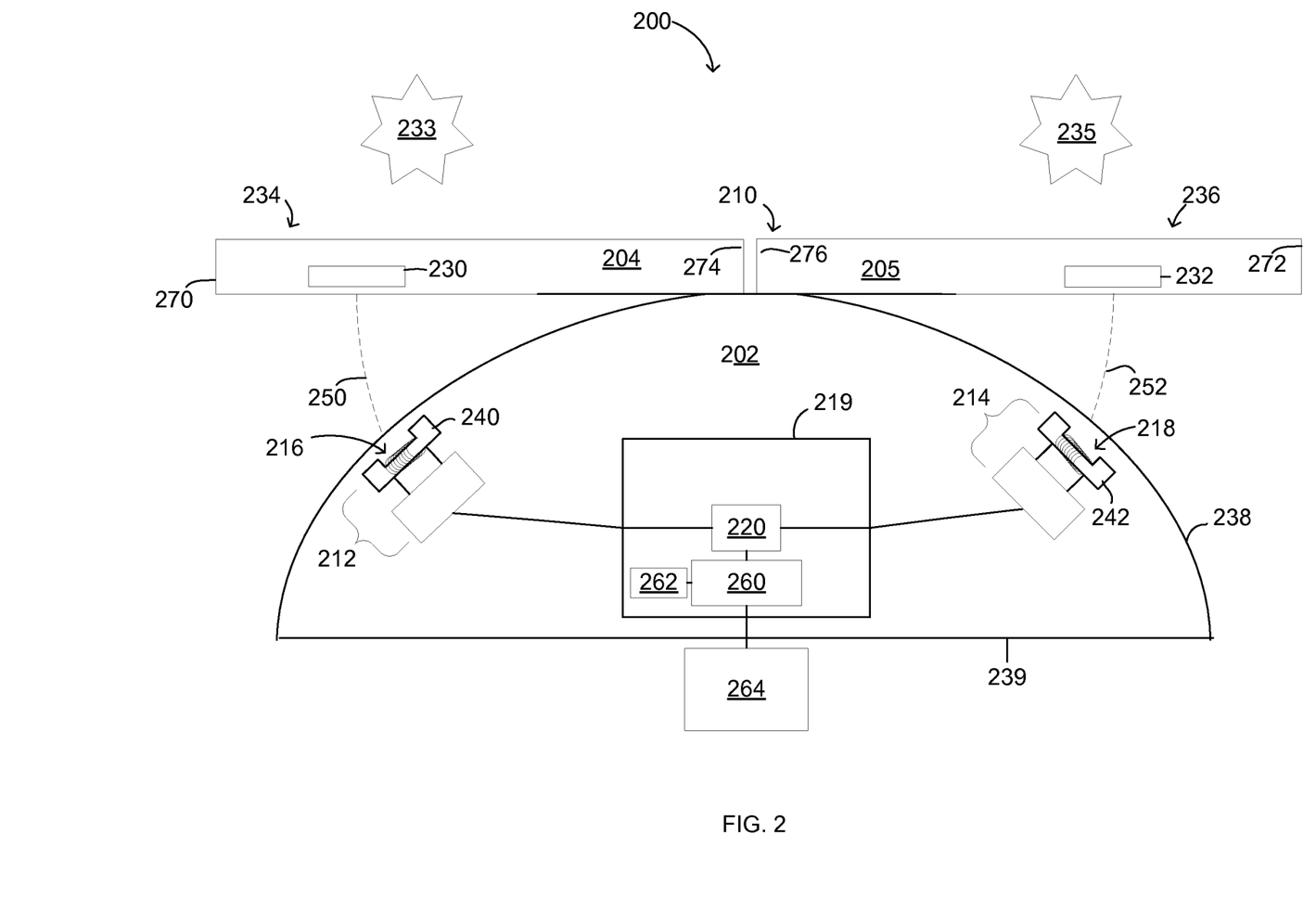
FIG. 2 depicts an overhead component view of a hub and two flexible members according to embodiments of the present invention.

FIG. 2 depicts embodiments in which inductor elements 230, 232 are placed within separate members 204, 205. While the embodiments in FIG. 2 illustrate the inductor elements 230, 232 placed towards a distal end 270, 272 of the members 204, 205, in other embodiments the inductor elements 230, 232 may be placed toward a proximal end 274, 276 of the members 204, 205. In some embodiments, the members 204, 205 are flexible members that are rigidly fixed at the proximal end 274, 276 to the hub 202. For example, the members 204, 205, like the member 104 in FIG. 1, may be fixed to the hub 202 by clamps or by a set of bolts. In other embodiments, the members 204, 205 are rigid members that are flexibly coupled to the hub 202 at the proximal end 274, 276. For example, the members 204, 205 may each be coupled to the hub 202 using springs or a resilient adhesive. In yet other embodiments the members 204, 205 may be either flexible or rigid and may be flexibly or rigidly fixed to the hub 202. Like the embodiments discussed above, the members 204, 205 move their inductive elements 230, 232 toward oscillating circuits 212, 214 in the hub 202 along arcs or curves 250, 252 after contacting obstacles 233, 235. Thereafter, the navigation sensor 219 measures the oscillating frequencies altered by the moving inductive elements to identify and execute navigational tasks. The navigation sensor 219 may employ a frequency analyzer 220, directional adjuster 260, and/or memory 262 that stores calibration data for the system 200, as well as a vehicle control system 264.

The embodiments shown in FIG. 2 also include inductors 216 and 218 that are wrapped around soft ferrite U-cores 240 and 242, respectively. FIG. 2 also shows that the inductor element 230 is located within the left half 234 of the member 204, that the inductor element 232 is located within the right half 236 of the member 205, and that the hub 202 includes a curved front surface 238 and a back surface 239.

Figure 3:
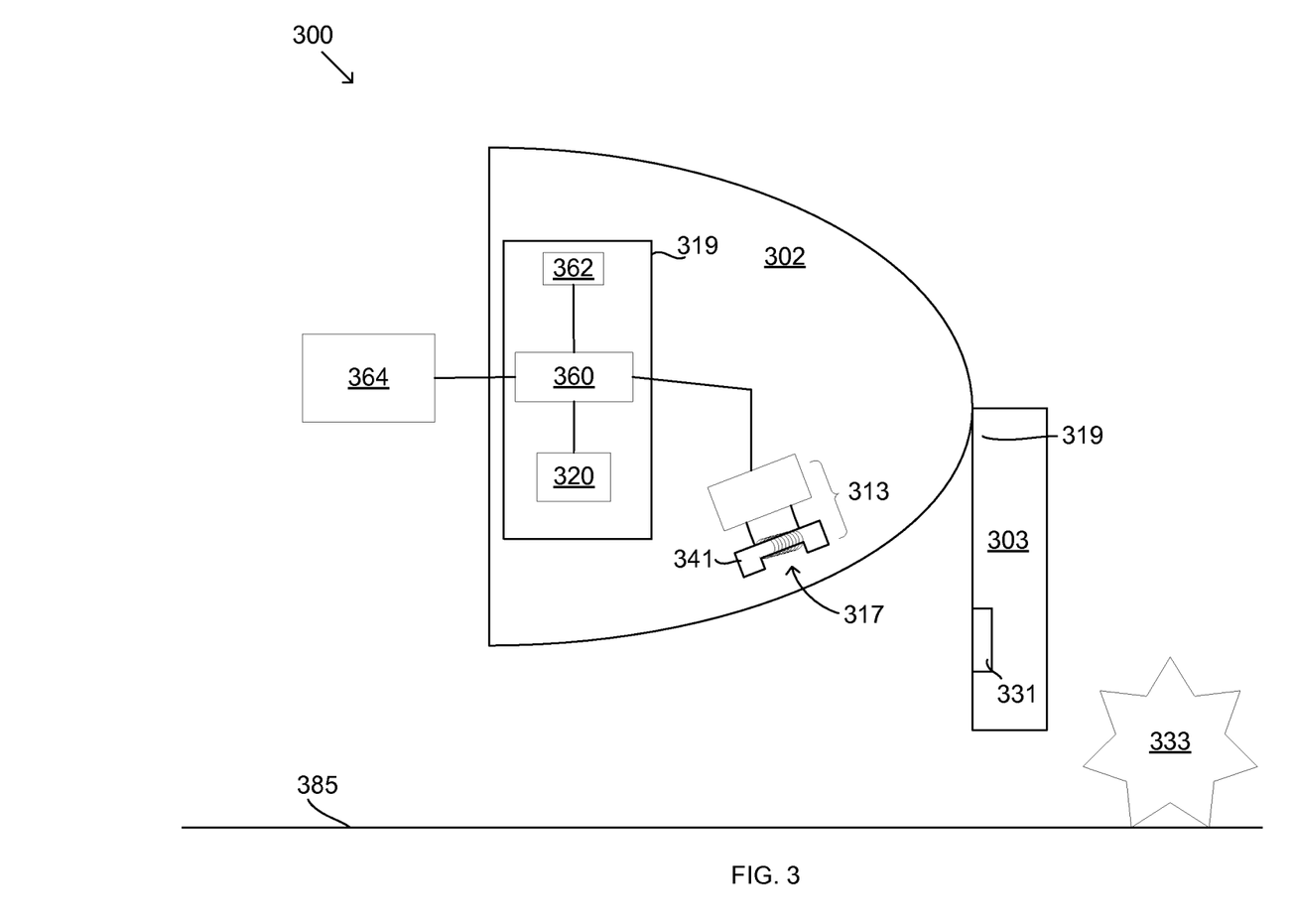
FIG. 3 depicts side component view of a hub with a downwardly extending flexible member according to embodiments of the present invention.

In the embodiments shown in FIG. 3, the crop feeler system 300 includes a member 303 that extends vertically from the hub 302. Like the member 204 and/or 205 in FIG. 2, member 303 includes an inductive element 331. The hub 302 includes an oscillating circuit 313 with an inductor 317 wrapped around a soft ferrite U-core 341. In some embodiments, the member 303 is vertically aligned to control the height of the vehicle or the height of a component of the vehicle. For example, if the vehicle employs a sugar cane cutter or a plow, the user may be concerned about the height of the cutter or the plow relative to the crop or to the ground. For another example, the user may be concerned that a bottom portion of the vehicle or the hub may contact the ground. As the member 303 contacts an object (e.g., object 333) or the ground 385, the member 303 will flex towards the hub 302 and bring the inductive element 331 closer to the oscillating circuit 313. This will alter the oscillating frequency of the oscillating circuit 313. The navigation sensor 319, which includes a frequency analyzer 320, a directional adjuster 360 and/or a memory 362, and which may be coupled to a vehicle control system 364, measures the oscillating frequency and, in combination with the vehicle control system 364, automatically adjusts the height of the vehicle (e.g., the cutter) to a desired level and/or executes other navigational tasks. While FIG. 3 illustrates a single member 303, it is contemplated that multiple downwardly-extending members 303 could be used and/or horizontal members (e.g., member 104 in FIG. 1) could be used in conjunction with one or more downwardly-extending members 303.

In some embodiments, the response for each crop feeler system is generally consistent. However, in some embodiments the crop feeler system exhibits some non-linear properties. Thus, while in some embodiments a single set of calibration data could be used for multiple crop feeler systems, in other embodiments accurate results may be obtained if each crop feeler system has its own set of calibration data. Once created, the calibration data may be stored in the memory of the navigation sensor.

Figure 4:
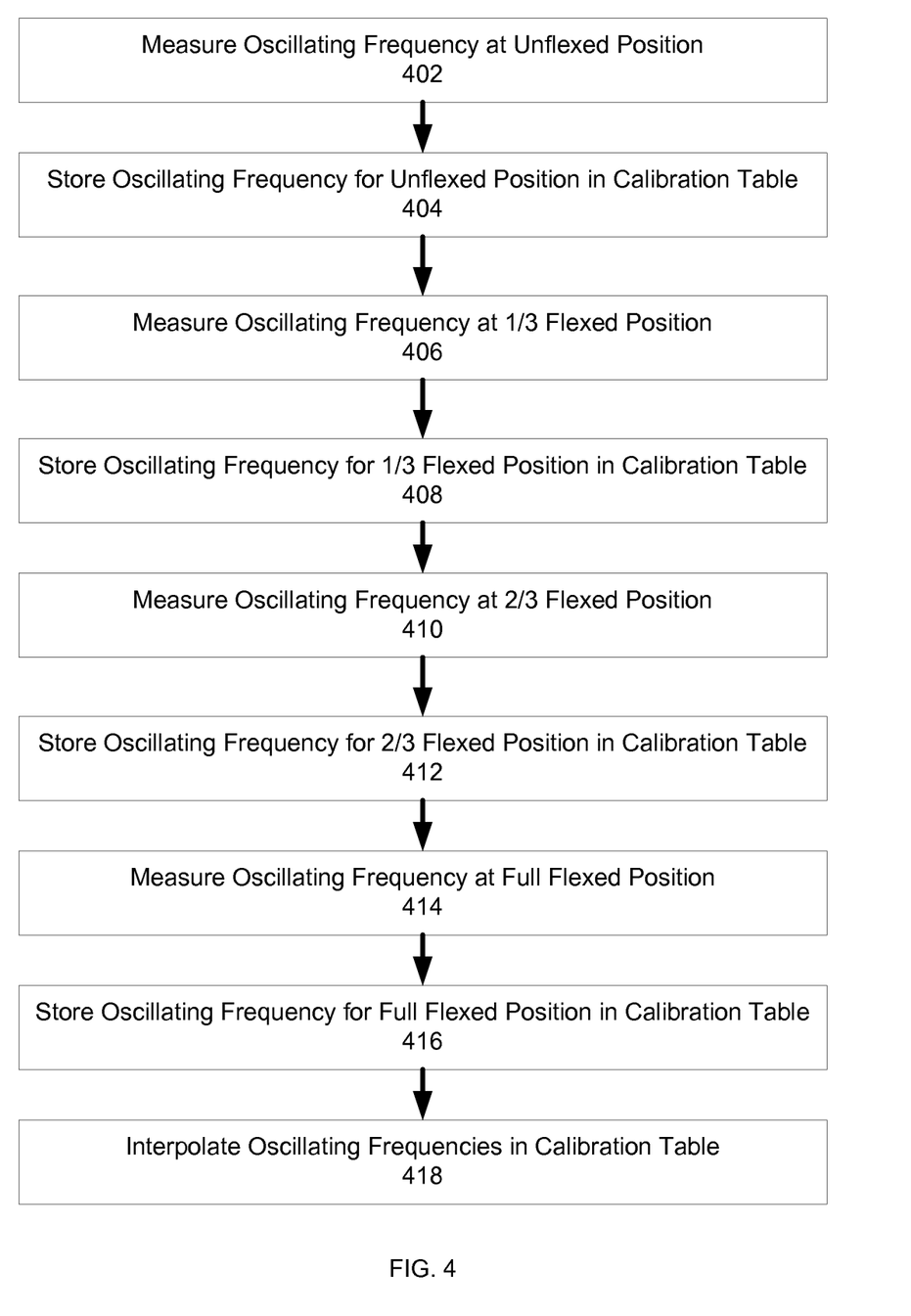
FIG. 4 illustrates steps for creating calibration data according to embodiments of the present invention.

FIG. 4 illustrates various steps that may be performed by the crop feeler system (e.g., crop feeler system 100) according to some embodiments in order to create a particular set of calibration data for the crop feeler system. The crop feeler system may also perform additional steps not explicitly shown in FIG. 4 or may perform less than all the steps shown in FIG. 4. As shown in step 402, the oscillating frequency of an oscillating circuit is measured when the member is in an unflexed position (i.e., a default position when no external forces propel the member towards the hub). As shown in step 404, data indicative of the oscillating frequency is stored in a calibration table (e.g., in memory 162). As shown in step 406, one side of the member (e.g., side 134 with inductive element 130) is flexed to a specific flexing position (e.g., ⅓ of the distance between the hub 102 and the unflexed position of the member 104) and the resulting frequency of the oscillating circuit is measured. That information is stored in a calibration table, as shown in step 408. As shown in steps 410 through 416, those steps are repeated as the member is brought through various flexing positions up to the full flexed position (i.e., where the member 104 contacts the hub 102). As shown in step 418, data points for flex positions between measured flex positions may be estimated using interpolation, averaging, or other techniques. In some embodiments, the calibration table is normalized to account for the frequency of the oscillating circuit when the member 104 is in the unflexed position. In other words, in those embodiments the calibration table indicates the frequency change as the member 104 flexes through various positions.

The steps shown in FIG. 4 illustrate data points taken at particular intervals (i.e., ⅓) along the flexing path. Other embodiments may use shorter or longer intervals (e.g., every 5 degrees). Some embodiments may use irregular intervals. In some embodiments, more data points may be taken around particular flex points or regions of flex points. For example, more data points may be taken around the ⅓ flex position than the full flex position in anticipation that calibration data will be used more frequently for flex positions around that ⅓ mark. Still other flex positions may be chosen for additional data because of non-linear effects in the system. In addition, FIG. 4 describes steps with respect to a particular oscillating circuit and a particular side of the member (with a particular inductive element). In some embodiments those steps are repeated for each oscillating circuit and its corresponding member side/inductive element. In some embodiments, the steps of FIG. 4 for two or more oscillating circuits are performed concurrently.

Figure 5:
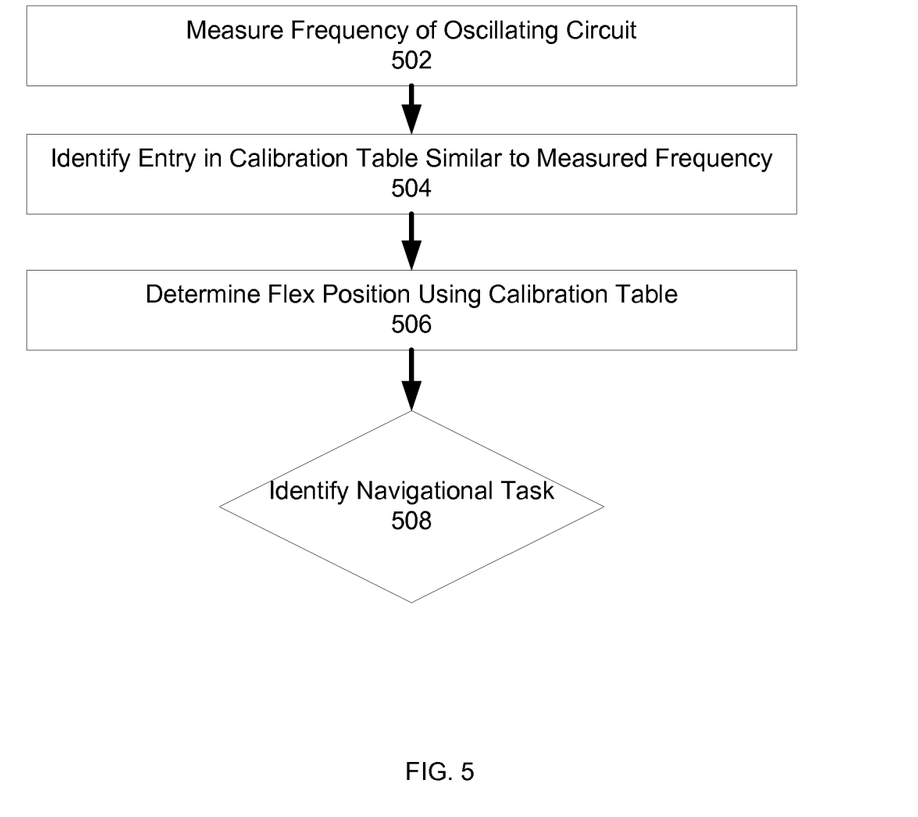
FIG. 5 illustrates steps for determining a navigational task according to embodiments of the present invention.

FIG. 5 illustrates steps that the crop feeler system (e.g., crop feeler system 100) may perform to identify and execute a navigational task, according to some embodiments. As shown in step 502, the navigation sensor measures the frequency of the oscillating circuits. If the navigation sensor uses a calibration table in which the entries are normalized (e.g., if the entries are altered to account for the oscillating frequencies when the member is in the unflexed position), the frequency measurements may likewise be normalized. As shown in steps 504 and 506, the navigation sensor then identifies an entry (or entries) in the calibration table similar to the measured frequencies and determines a flex position using that entry (or those entries). For example, the measured frequency may be within a predetermined range of a calibration entry (e.g., within 2% of the frequency in the calibration entry), such that the navigation sensor may simply use the flexed position data associated with that calibration entry. If the measured frequency is outside of the predetermined range, then the navigation sensor may use the closest two calibration entries to determine the flex position by taking a simple average of the two calibration entries, using a weighted average system to account for the relative location of the measured frequency with respect to the calibration entries, or may use other interpolation techniques to identify a flex position.

In some embodiments, the navigation sensor is configured to account for temperature variations. For example, the navigation sensor measures the frequency of the oscillating circuits when the member is in the unflexed position and compares those measurements with the corresponding entries in the calibration table. Any differences between those measurements will be largely from changes in temperature of the ferrite cores. The navigation sensor then adjusts the entries in the calibration table based on those differences. In some embodiments, the navigation sensor performs this adjustment multiple times during a measurement session, for example, each time a user indicates the member is in an unflexed position or, if the hubs are located on a boom or on a head of the vehicle, each time the boom or head is lifted.

As shown in step 508 in FIG. 5, the system identifies a navigational task. In some embodiments the navigational task may be predefined by a user. For example, the navigation sensor may be set to compute the distance from the obstacle to the vehicle and transmit that information to a user interface. In other embodiments, the navigational task may include determining navigational instructions that depend on the flex position. For example, if the member is in a ⅓ flex position, the navigation sensor determines that the navigational task is to steer around the obstacle. If the member is in a full flex position, however, then the navigation sensor determines that the navigational task is to immediately stop the vehicle. In some embodiments, the navigational task depends on the flex positions of both sides of the member. For example, if the left side of the member is in a ⅓ flexed position and the right side is in an unflexed position (either at one moment or over an ensemble of measurements), the navigational instructions determined by the navigation sensor may direct the vehicle to veer to the right. If the left side of the member is in a ⅔ flexed position (either at one moment or over an ensemble of measurements), then the navigational instructions may direct the vehicle to take veer to the right to a greater degree. The navigational instructions may direct the vehicle to change various parameters, such as speed, direction, degree of turn, and/or vehicle-specific parameters. Those instructions are transmitted to the vehicle control system, where the instructions are executed. Executing the navigational instructions may occur automatically or in response to user implementation and/or oversight.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A system for automatically executing a navigational task based on a proximity of a vehicle to an obstacle, the system comprising:
 a hub attached to the vehicle, the hub including an oscillating circuit having an oscillating frequency;
 a member coupled to the hub, the member including an inductive element adapted to alter the oscillating frequency commensurate with its proximity to the oscillating circuit; and
 a navigation sensor adapted to:
 determine the oscillating frequency of the oscillating circuit; and
 identify a navigational task using a set of calibration data and the oscillating frequency of the oscillating circuit.

2. The system of claim 1, wherein the member is a flexible wand adapted to flex when the obstacle comes into contact with the flexible wand.

3. The system of claim 1, wherein the navigation sensor is adapted to execute the navigational task or transmit instructions to execute the navigational task.

4. The system of claim 1, wherein the member is adapted to decrease the oscillating frequency of the oscillating circuit by moving the inductive element closer to the oscillating circuit when the member comes into contact with the obstacle.

5. The system of claim 1, wherein the oscillating circuit includes an inductor and wherein the inductive element is a manganese-zinc-based ferrite core or other high permeability ferrite material.

6. The system of claim 1, wherein the navigation sensor is adapted to identify the navigational task by applying a displacement curve to a series of frequency measurements for the oscillating circuit.

7. The system of claim 6, wherein navigation sensor is adapted to assign less weight to outlying frequency measurements in the series of frequency measurements.

8. The system of claim 6, wherein the navigation sensor is adapted to assign more weight to outlying frequency measurements in the series of frequency measurements.

9. The system of claim 8, wherein the navigation sensor is adapted to determine a plurality of oscillating frequencies of the first and second oscillating circuits and to identify the navigational task using the plurality of oscillating frequencies.

10. The system of claim 9, wherein the navigation sensor is adapted to identify the navigational task by comparing oscillating frequencies from the first oscillating circuit and the second oscillating circuit.

11. The system of claim 1, wherein the oscillating circuit is a first oscillating circuit having a first oscillating frequency and the inductive element is a first inductive element, and wherein the hub includes a second oscillating circuit having a second oscillating frequency;
the system includes a second inductive element adapted to alter the second oscillating frequency commensurate with its proximity to the second oscillating circuit; and
the navigation sensor is adapted to
determine the second oscillating frequency of the second oscillating circuit; and
identify the navigational task using the second oscillating frequency of the second oscillating circuit and the first oscillating frequency of the first oscillating circuit.

12. A method for navigating a vehicle with respect to an obstacle, the method comprising:
 measuring a first oscillating frequency of a first oscillating circuit attached to the vehicle, the first oscillating frequency commensurate with a proximity of a first inductive element in a flexible member to the first oscillating circuit;
 measuring a second oscillating frequency of a second oscillating circuit attached to a vehicle, the second oscillating frequency commensurate with a proximity of a second inductive element in the flexible member to the second oscillating circuit;
 determining a navigational task using a set of calibration data, the first oscillating frequency and the second oscillating frequency; and
 executing the navigational task to navigate the vehicle.

13. The method of claim 12, wherein determining the navigational task using the first oscillating frequency and the second oscillating frequency includes using calibration data that has been normalized based on the oscillating frequencies of the first and second oscillating circuits when the first and second inductive elements are at initial proximities to the first and second oscillating circuits.

14. The method of claim 12, wherein determining the navigational task using the first oscillating frequency and the second oscillating frequency includes using calibration data that has been normalized based at least in part on temperatures of the first and second oscillating circuits.

15. The method of claim 12, wherein measuring the first oscillating frequency and measuring the second oscillating frequency includes measuring a plurality of oscillating frequencies of the first and second oscillating circuits and wherein determining the navigational task includes using an ensemble technique to process the plurality of oscillating frequencies.

16. The method of claim 12, wherein measuring the first oscillating frequency and measuring the second oscillating frequency includes measuring a plurality of oscillating frequencies of the first and second oscillating circuits and wherein determining the navigational task includes fitting a curve to the plurality of oscillating frequencies to identify a relative position of crop rows with respect to a vehicle.

17. The method of claim 12, further comprising resetting a navigation sensor that is adapted to execute the step of determining the navigational task using the first oscillating frequency and the second oscillating frequency, wherein resetting the navigation sensor includes setting measurements of the first and second oscillating frequencies as indicative of a desired relative location of a vehicle with respect to one or more crop rows.

18. A navigation sensor comprising:
 an inductive element adapted to alter the oscillating frequency commensurate with its proximity to an oscillating circuit;
 a frequency analyzer adapted to measure oscillating frequencies of the oscillating circuit and determine a course adjustment for the vehicle using a set of calibration data stored in a memory and the oscillating frequencies of the oscillating circuit; and a directional adjuster adapted to automatically execute the course adjustment for the vehicle.

19. The navigation sensor of claim 18, wherein the oscillating circuit is a first oscillating circuit and the oscillating frequencies are a first set of oscillating frequencies, and wherein the frequency analyzer is further adapted to measure a second set of oscillating frequencies of a second oscillating circuit.

20. The navigation sensor of claim 19, wherein the frequency analyzer is adapted to determine the course adjustment using the set of calibration data, the first set of oscillating frequencies, and the second set of oscillating frequencies.

* * * * *